United States Patent
Jetton et al.

(10) Patent No.: US 10,251,417 B2
(45) Date of Patent: *Apr. 9, 2019

(54) DEVICE FOR PREPARATION OF GELATIN-BASED PRODUCTS

(71) Applicant: FOOD & BEVERAGE INNOVATIONS, LLC, Portland, OR (US)

(72) Inventors: Jeff Jetton, Portland, OR (US); Jordan Blakley, Beaverton, OR (US); Kenneth Tarlow, Ukiah, CA (US); Brant Proden, Springfield, OR (US)

(73) Assignee: Food & Beverage Innovations, LLC, Portland, OR (US)

( * ) Notice: Subject to any disclaimer, the term of this patent is extended or adjusted under 35 U.S.C. 154(b) by 238 days.

This patent is subject to a terminal disclaimer.

(21) Appl. No.: 15/264,472

(22) Filed: Sep. 13, 2016

(65) Prior Publication Data

US 2017/0086492 A1 Mar. 30, 2017

Related U.S. Application Data

(63) Continuation-in-part of application No. 13/815,132, filed on Feb. 1, 2013, now Pat. No. 9,439,450.
(Continued)

(51) Int. Cl.
*A23P 1/10* (2006.01)
*A23G 3/02* (2006.01)
(Continued)

(52) U.S. Cl.
CPC .......... *A23P 10/00* (2016.08); *A23G 3/0257* (2013.01); *A23K 30/10* (2016.05); *A23L 29/284* (2016.08);
(Continued)

(58) Field of Classification Search
CPC .... A47J 36/165; A47J 2031/165; A47J 43/04; A47J 9/005; A47J 9/006; A23L 1/05625; A23G 3/0257
(Continued)

(56) References Cited

U.S. PATENT DOCUMENTS 1,522,428 A   1/1925 Ferguson
3,037,674 A   6/1962 Brady et al.
(Continued)

FOREIGN PATENT DOCUMENTS

EP    1570745 A1    9/2005
JP    2007319108 A  12/2007
(Continued)

OTHER PUBLICATIONS

ISA Korean Intellectual Property Office, International Search Report and Written Opinion Issued in Application No. PCT/US2014/072286, dated Apr. 27, 2015, WIPO, 13 pages.
(Continued)

*Primary Examiner* — Reginald Alexander
(74) *Attorney, Agent, or Firm* — McCoy Russell LLP

(57) ABSTRACT

Systems and methods for preparing and dispensing single serving gelatin-based food products in an efficient and cost-effective way. A gelatin-based product making device includes a container receiving portion configured to removably receive one or more disposable dry ingredients containers that store dry ingredients used to make the gelatin-based products. The device is operative to automatically mix the dry ingredients with a liquid, heat the mixture, and rapidly cool the mixture to form a batch of gelatin-based product. The device includes a dispenser operative to dispense single servings of the gelatin-based product into cups that may be provided to consumers.

20 Claims, 7 Drawing Sheets

Related U.S. Application Data

(60) Provisional application No. 61/624,930, filed on Apr. 16, 2012.

(51) Int. Cl.
    *A23L 1/0562* (2006.01)
    *A23P 10/00* (2016.01)
    *C12G 3/00* (2019.01)
    *A23K 30/10* (2016.01)
    *A23P 30/10* (2016.01)
    *A23L 29/281* (2016.01)
    *A47J 9/00* (2006.01)
    *A47J 36/16* (2006.01)
    *A47J 43/04* (2006.01)

(52) U.S. Cl.
    CPC .............. *A23P 30/10* (2016.08); *C12G 3/00* (2013.01); *A47J 9/005* (2013.01); *A47J 36/165* (2013.01); *A47J 43/04* (2013.01)

(58) Field of Classification Search
    USPC ......... 99/348, 353, 357, 355, 428, 439, 453, 99/455, 484
    See application file for complete search history.

(56) References Cited

U.S. PATENT DOCUMENTS

| | | |
|---|---|---|
| 3,371,626 A | 3/1968 | Hachtman |
| 3,452,689 A | 7/1969 | Kinney et al. |
| 4,055,892 A | 11/1977 | Del Vecchio |
| 4,617,908 A | 10/1986 | Miller et al. |
| 5,404,922 A | 4/1995 | Sliter |
| 6,303,175 B1 | 10/2001 | Kürzinger et al. |
| 6,596,334 B1 | 7/2003 | Flickinger et al. |
| 6,663,907 B1 | 12/2003 | Pratolongo |
| 2002/0031591 A1 | 3/2002 | Kerrigan et al. |
| 2004/0013783 A1 | 1/2004 | Miller |
| 2006/0016347 A1 | 1/2006 | Girard et al. |
| 2006/0099316 A1 | 5/2006 | Nuckles et al. |
| 2007/0215239 A1 | 9/2007 | Dorney |
| 2009/0148582 A1 | 6/2009 | Leibovich et al. |
| 2010/0140302 A1 | 6/2010 | Knobel |
| 2011/0033599 A1 | 2/2011 | Uttinger |
| 2011/0129588 A1 | 6/2011 | Marini |
| 2011/0223308 A1 | 9/2011 | Motzaeli et al. |
| 2012/0006204 A1 | 1/2012 | Eidenschink et al. |
| 2012/0314059 A1 | 12/2012 | Hoffmann et al. |
| 2016/0309763 A1 | 10/2016 | Jetton et al. |

FOREIGN PATENT DOCUMENTS

| | | |
|---|---|---|
| WO | 9848642 A1 | 11/1998 |
| WO | 2011096979 A2 | 8/2011 |

OTHER PUBLICATIONS

United States Patent and Trademark Office, Precedential Opinion Issued in U.S. Appl. No. 10/132,492, dated Oct. 1, 2009, USPTO, 47 pages.

European Patent Office, Extended European Search Report Issued in Application No. 14873614.3, dated Nov. 13, 2017, Germany, 68 pages.

DEVICE FOR PREPARATION OF GELATIN-BASED PRODUCTS

CROSS-REFERENCE TO RELATED APPLICATIONS

The present application is a Continuation-in-Part of U.S. patent application Ser. No. 13/815,132, entitled "DEVICE FOR PREPARATION OF GELATIN-BASED PRODUCTS", filed Feb. 1, 2013, which claims priority to U.S. Patent Application No. 61/624,930, entitled "DEVICE FOR PREPARATION OF GELATIN-BASED PRODUCTS", filed Apr. 16, 2012, the entire contents of each of which are hereby incorporated by reference for all purposes.

FIELD

The present invention is directed generally to preparing food products and more particularly, to systems and methods for preparation of gelatin-based food products.

DESCRIPTION OF THE RELATED ART

Gelatin-based food products are food products made with gelatin, a substance commonly used as a gelling agent in food, pharmaceuticals, and cosmetic manufacturing. These food products can be made by combining plain gelatin with other ingredients or by using a premixed powder blend of gelatin with additives. The powdered blend may be dissolved in very hot water, then chilled and allowed to set. A popular brand of premixed gelatin includes Jell-O® from Kraft Foods, Inc. Fully prepared gelatin food products are sold in a variety of forms, ranging from large decorative shapes to individual serving cups. Individual serving cups of gelatin-based products are sold in thousands of bars and markets throughout the United States. A popular recipe calls for the addition of an alcoholic beverage (e.g., rum or vodka) to the gelatin mix, to create alcoholic gelatin-based food products (often referred to as "Jell-O® shots"). These products provide add-on sales for bars, night clubs, and resorts, and generally do not compete with the other consumables that a business sells to generate income. Currently, the production of gelatin-based products takes significant time and energy that could be invested into other avenues of a business. From start to finish, making a single batch of gelatin-based food products may take four hours or more. Serving large amounts of gelatin-based food products requires substantial kitchen and refrigeration space to be used for preparation and housing until they are served and sold.

DETAILED DESCRIPTION

The following description is exemplary in nature and is not intended to limit the scope, applicability, or configuration of the invention in any way. Various changes to the described embodiments may be made in the function and arrangement of the elements described herein without departing from the scope of the invention.

As used in this application, the singular forms "a," "an," and "the" include the plural forms unless the context clearly dictates otherwise. Additionally, the term "includes" means "comprises." Further, the term "coupled" generally means electrically (wired or wirelessly), electromagnetically, and/or physically (e.g., mechanically or chemically) coupled or linked and does not exclude the presence of intermediate elements between the coupled or associated items absent specific contrary language.

Although the operations of exemplary embodiments of the disclosed method may be described in a particular, sequential order for convenient presentation, it should be understood that disclosed embodiments can encompass an order of operations other than the particular, sequential order disclosed. For example, operations described sequentially may in some cases be rearranged or performed concurrently. Further, descriptions and disclosures provided in association with one particular embodiment are not limited to that embodiment, and may be applied to any embodiment disclosed.

Moreover, for the sake of simplicity, the attached figures may not show the various ways (readily discernable, based on this disclosure, by one of ordinary skill in the art) in which the disclosed system, method, and apparatus can be used in combination with other systems, methods, and apparatuses. Additionally, the description sometimes uses high-level terms such as "provides" to describe the disclosed method. These terms are high-level abstractions of the actual operations that can be performed. The actual operations that correspond to these terms can vary depending on the particular implementation and are, based on this disclosure, readily discernible by one of ordinary skill in the art. The design referred to as the "second embodiment" represents one specific method of accomplishing the goals of the present invention.

Embodiments of the present invention are directed to systems and methods for preparation of gelatin-based products in an efficient and cost-effective way so the products may be provided (e.g., sold) to consumers. This enables businesses, such as bars, night clubs, restaurants, and resorts, which otherwise would not sell these products due to the inconvenience of preparing and storing them, to profitably sell the products.

Figure 1:
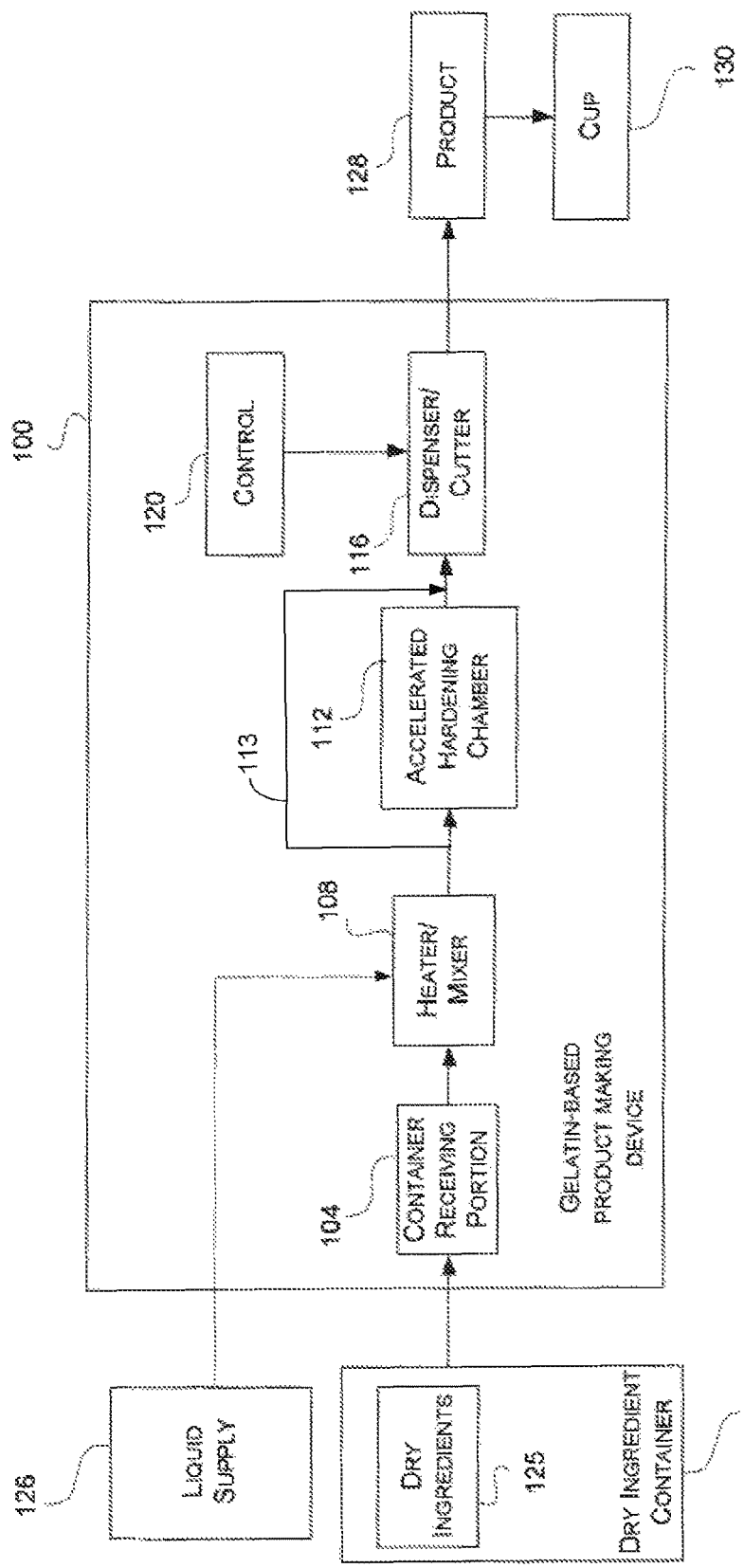
FIG. 1 is a block diagram of a device for preparation of a gelatin-based product in accordance with an embodiment of the present invention.

FIG. 1 illustrates a machine or device 100 for preparation of gelatin-based food products in accordance with an embodiment of the invention. Generally, the device 100 is operative to prepare and dispense multiple single servings of a gelatin-based product. The device 100 may be sized to easily fit on the counter of a bar or restaurant without taking up a large amount of space. For example, in some embodiments the device 100 has a width of less than 12 inches, a depth of less than 20 inches, and a height of less than 25 inches, although other sizes are contemplated. A description of a process for preparing the gelatin-based product is provided below with reference to FIG. 2.

The device 100 includes a container receiving portion 104 shaped and sized to removably receive a dry ingredients container 124 which houses dry ingredients 125 used to make the gelatin-based product. As an example, the dry ingredients 125 may include powdered gelatin, one or more flavoring ingredients, (e.g., vitamins, etc.). The container receiving portion 104 may be configured to receive one or more dry ingredients containers 124 simultaneously.

Figure 3:
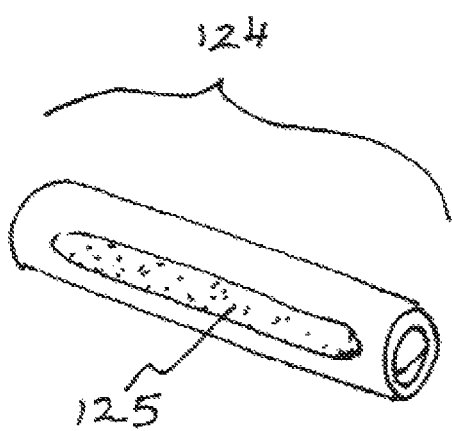
FIG. 3 illustrates an example of a dry ingredient packaged product container usable with the device of FIG. 1.

The dry ingredients container 124 may be sized and shaped to uniquely interface with the container receiving portion 104 of the device 100. For example, in some embodiments, the dry ingredients container 124 includes a specially-shaped male nozzle that fits into a corresponding specially-shaped female component of the container receiving portion 104 so the dry powder can be extracted from the container 124. Further, in some embodiments the dry ingredients container 124 may include an indicator (e.g., a microchip) readable by the container receiving portion 104 that allows the device 100 to determine whether a container is authorized for use with the device 100. In this regard, the device 100 is configured to receive only dry ingredient containers especially made for it which, among other things, improves quality control and reduces the likelihood that unauthorized containers could cause damage to the device. One example of a dry ingredients container 124 is shown in FIG. 3 and described below.

The device 100 also includes a heater/mixer chamber 108 configured to receive the dry ingredients 125 that have been extracted from the dry ingredients container 124 and liquid from a liquid supply 126. The liquid may comprise one or more types of liquid including water, flavored beverages, alcoholic beverages, and the like.

The device 100 further includes an accelerated hardening chamber 112 (also referred to herein as a chilling device) designed to speed up the rate at which the heated liquid mixture from the heater/mixer chamber 108 is transformed into a gel. To achieve this functionality, the accelerated hardening chamber 112 operates to expose the heated liquid mixture to relatively cool temperatures for a specified period of time (e.g., ten minutes, or the like).

The device 100 also includes a dispenser/cutter 116 operative to cut the resulting gelatin-based product 128 into single serving sizes and to dispense the product 128 in a cup 130 positioned inside or proximate to the device 100. The dispenser/cutter 116 may be coupled to a control 120 operative to actuate the dispenser/cutter. In some embodiments, the control 120 comprises a mechanical dispensing handle that a user may pull or otherwise move to cause the dispenser/cutter 116 to operate. In some embodiments, the control 120 may include an electronic system with inputs (e.g., buttons, knobs, etc.) that allow a user to operate the device 100. It should be appreciated that any type of control 120 may be used to operate the device 100.

In a first mode of operation, the heated liquid mixture may pass through the accelerated hardening chamber 112 to the dispenser 116. In a second mode of operation, the heated liquid mixture may not pass through the accelerated hardening chamber 112 and instead bypass the accelerated hardening chamber via bypass line 113. In this way, the heated liquid mixture may not be chilled by the chilling device and instead be dispensed by the dispenser 116 at a higher temperature than during the first mode. The product 128 may then be removed from the device before being fully hardened. A user may then insert the product (e.g., in the cups) into an external refrigerator to further refrigerate and solidify the gelatin-based product. In some embodiments, the chilling device may include multiple chilling devices (e.g., multiple hardening chambers). For example, there may be multiple stages or chilling devices for chilling the heated liquid mixture. In a third mode, the heated liquid mixture may flow through and be chilled by a first stage (or chilling device) of the accelerated hardening chamber 112 and then bypass and not flow through a second stage (or chilling device) of the accelerated hardening chamber 112. In this way, the heated liquid mixture may only be partially chilled (e.g., chilled to a higher temperature than in the first mode but a cooler temperature than the second mode) before being dispensed via the dispenser 116. In the second and third modes, the gelatin-based products may be prepared more quickly within the device 100 than in the first mode. As such, the gelatin-based products may be removed more quickly from the device 10 in the second and third modes than in the first mode. For example, the gelatin-based produce may be prepared in 10 minutes in the first mode and three minutes in the second or third mode.

Figure 2:
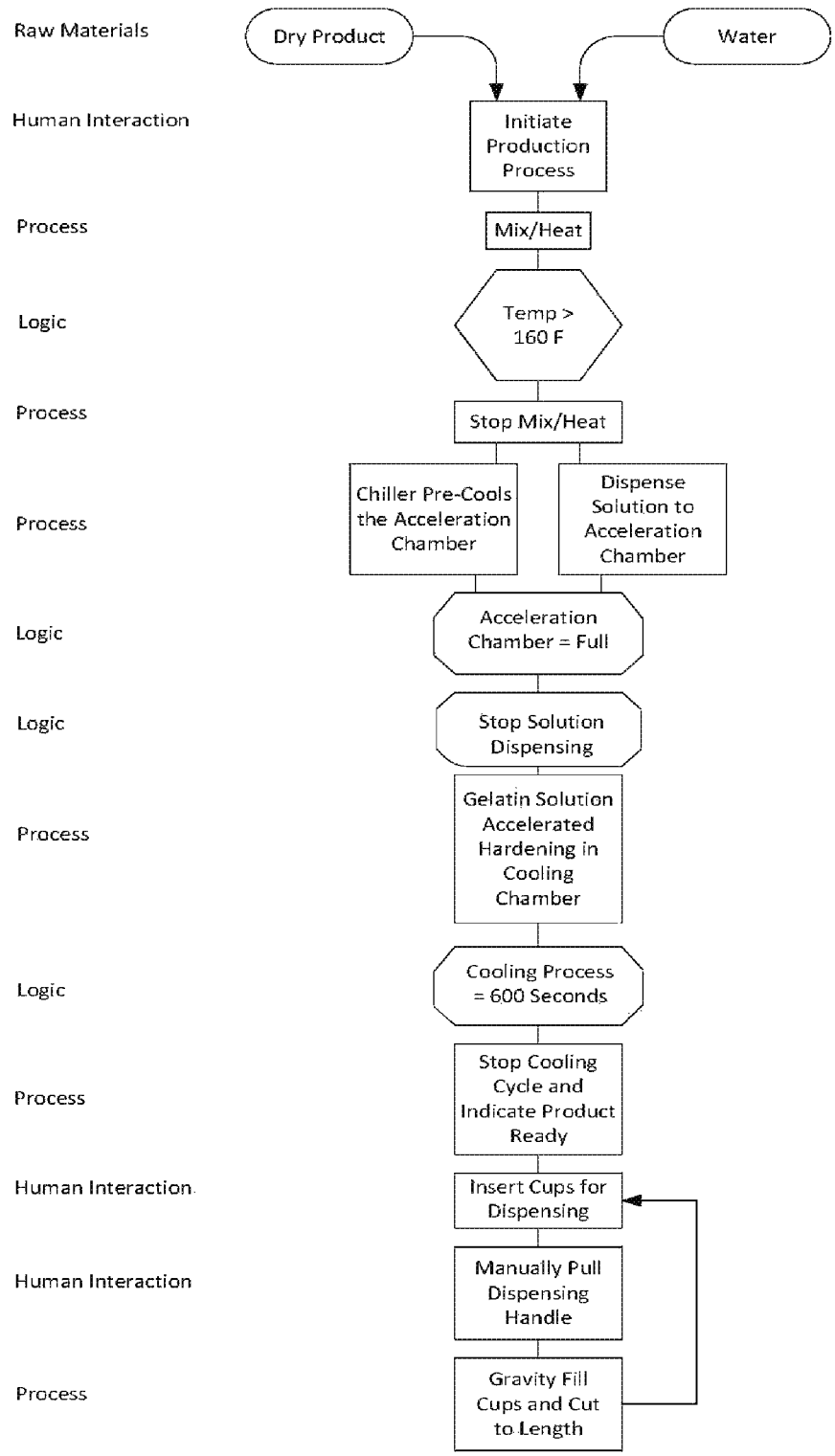
FIG. 2 illustrates a flow chart of a process for preparing a gelatin-based food product using the device of FIG. 1.

FIG. 2 illustrates a flowchart of an example process for preparing and dispensing single serving gelatin-based products using the device 100 of FIG. 1. Initially, a user initiates the production process, which causes dry product (i.e., the dry ingredients 125) and liquid (e.g., water, alcoholic beverage, etc.) to be mixed and heated in the mixer/heater chamber 108 to a temperature of approximately 160 degrees Fahrenheit. Simultaneously, the device 100 pre-cools the accelerated hardening chamber 112 in preparation for cooling the liquid mixture once it has been heated. The amount of dry product and liquid used is sufficient to prepare numerous single servings of a gelatin-based product at a time. For example, in some embodiments 30 to 40 single servings may be prepared at a time.

Once the liquid mixture has reached 160 degrees Fahrenheit, the heated liquid mixture is then dispensed into the pre-cooled accelerated hardening chamber 112 until the chamber is filled to a predetermined level. Then, the heated liquid mixture is rapidly cooled in the accelerated hardening chamber 112 until the mixture has gelled into a "batch" of gelatin-based product. In some embodiments, the mixture is cooled for approximately 10 minutes. The batch may take the form of a single piece of gelatin-based product or may be formed into multiple pieces. In some embodiments, the batch is formed as a single elongated piece having a rectangular or circular cross-section, but other shapes and sizes may also be used.

Once the batch of the product is ready, the user may insert a cup into or under the dispenser/cutter 116 of the device 100. The user may then operate the control 120 (e.g., a mechanical handle, electronic button, etc.) to cut the product to a single serving size and dispense it into the cup. As an example, in the case wherein the batch is formed into an elongated piece, the cutter may cut a predetermined length of piece along its cross-section to form the individual servings. The user may continue inserting cups and cutting/dispensing single serving products until the batch is fully used. Once the batch has been used, the user may repeat the process to prepare and serve a new batch.

Using the device 100, a batch of gelatin-based product may be prepared in 12 minutes, or less. In this regard, the device 100 provides the convenience of preparing and extracting numerous single serving gelatin-based products per hour (e.g., 150-200 per hour, etc.), which is advantageous when businesses are crowded with consumers. The device 100 may also include an attractive design that draws attention and inquiry from consumers. As will be appreciated, the device 100 is advantageous over the manual preparation method because it saves time and resources, while generating additional money for businesses selling the gelatin-based products.

FIG. 3 illustrates an example of a disposable dry ingredients container or cartridge 124 that may be used with the device 100. In this embodiment, the container 124 comprises a cylindrically-shaped housing formed from lined cardboard or plastic material. The housing includes plastic caps on each end. The housing also includes a removable sealer strip which covers an opening in the housing and provides access to dry ingredients 125 stored therein. In operation, a user may remove the sealer strip and place the container 124 into the container receiving portion 104 of the device 100 so that the dry ingredients 125 may be extracted from the container as needed. Once all of the dry ingredients 125 have been extracted from the container 124, the user may discard the container and insert a new dry ingredients container into the container receiving portion 104 of the device 100.

When used in bars or settings wherein alcoholic beverages are sold, the dry ingredients 125 may include one or more additives for providing energy for a consumer or for preventing or reducing the unpleasant physiological effects following heavy consumption of alcoholic beverages. Further, although the device 100 has been described above in the context of preparing alcoholic gelatin-based products, it should be appreciated that the device may be used in a variety of non-alcoholic applications as well. For example, the device 100 could be used in healthcare settings, wherein one or more of the dry or liquid ingredients may include vitamins, medication, or other beneficial substances. The device 100 may also be used to provide gelatin-based food products to consumers such as children in a variety of settings (e.g., schools, restaurants, sporting events, etc.).

FIGS. 4, 5, 6 and 7 show a second embodiment of the present invention 200.

Figure 4:
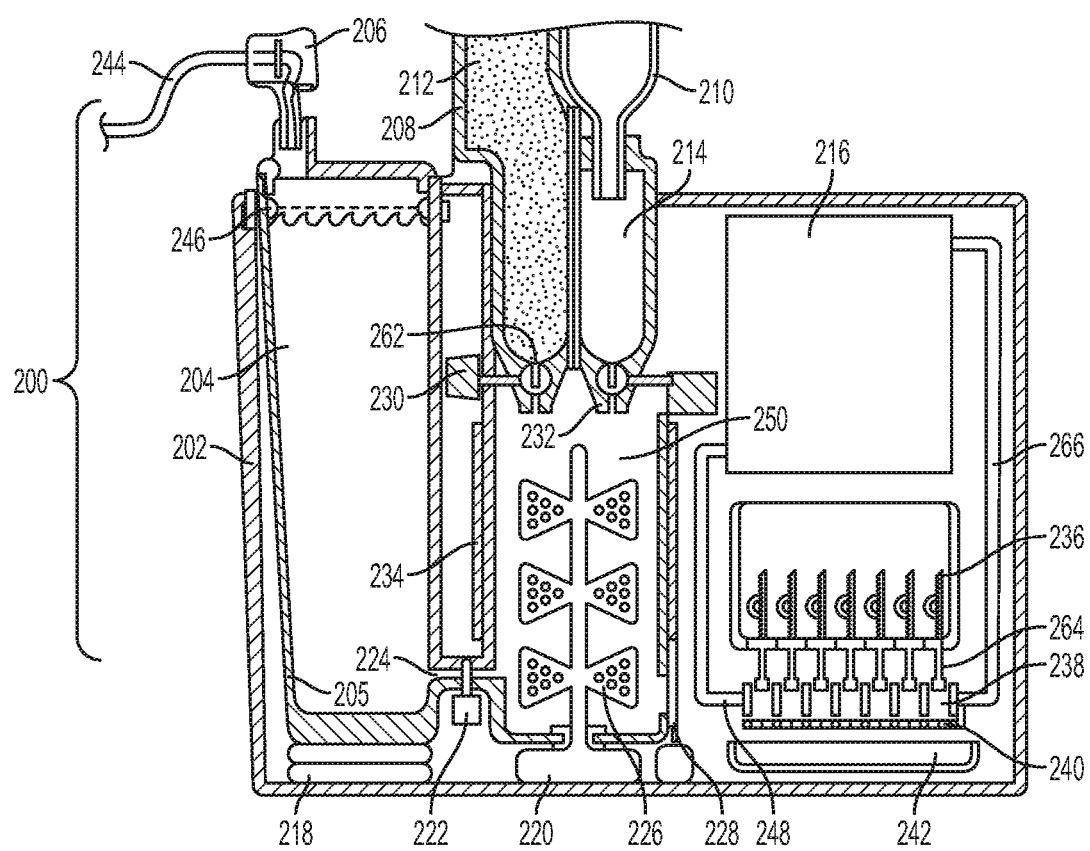
FIG. 4 is a front section view of a second embodiment of the invention.
Figure 5:
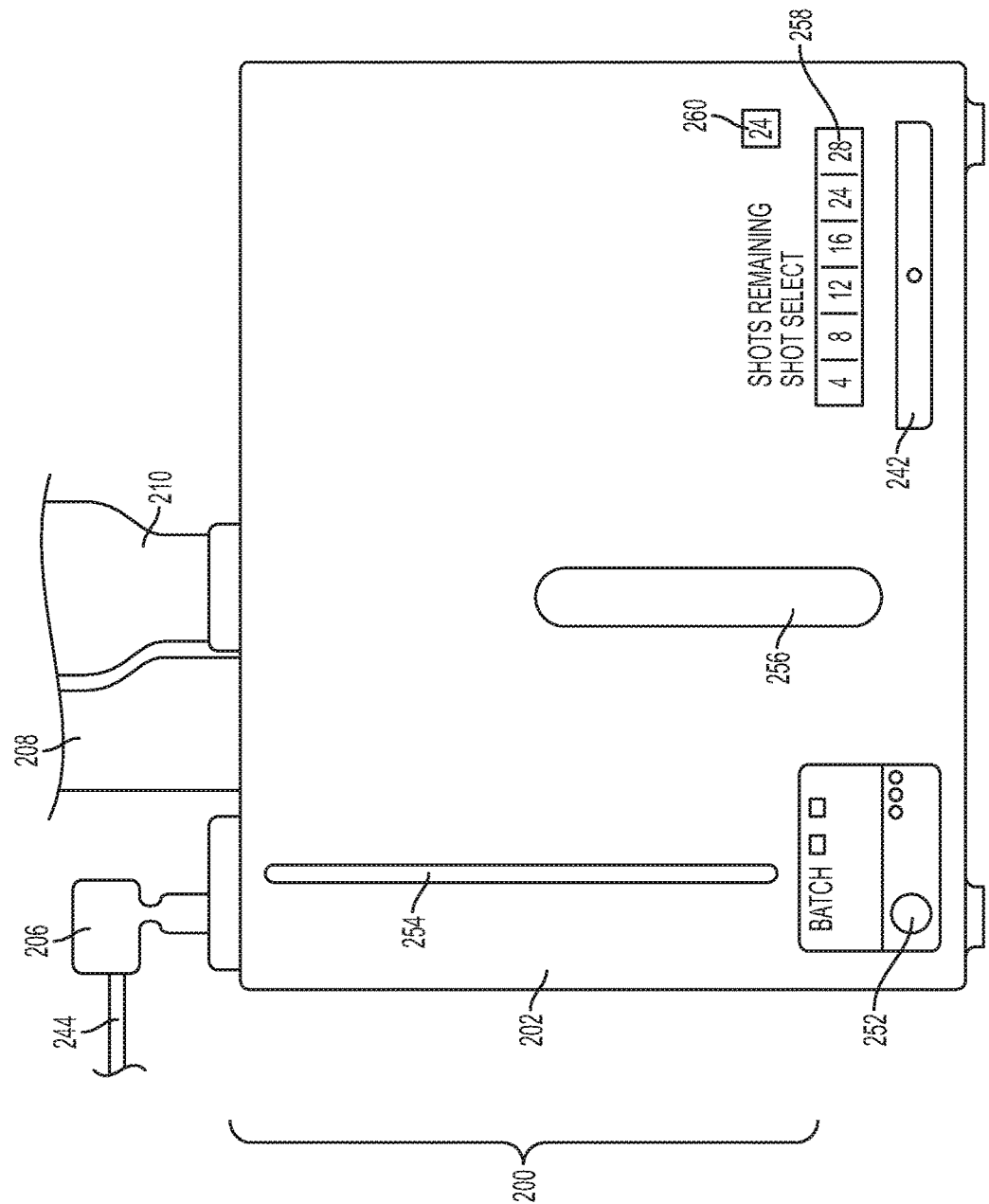
FIG. 5 is a front view of the second embodiment of the invention.

For purposes of this discussion, we will call the gelatin cubes that are formed by the present invention—gel shots. FIG. 5 is a front view of the invention 200. To start the gel shot making process, the user presses start button 252 which starts an automatic process beginning with the introduction of water 244 through solenoid valve 206 and into the water heating vessel 205 as shown in FIG. 4. FIG. 5 also shows water level viewing transparent panel 254 and gelatin level viewing transparent panel 256.

FIG. 4 is a front section view that vertically bisects the invention 200. A housing 202 encloses cylindrical water heating vessel 205, a cylindrical mixing chamber 250, a chilling device 216 and a gel tray 238 as well as support devices which will be discussed below. Water enters tube 244 from a standard pressurized water source and is selectively let into water heater vessel 205 by solenoid valve 206. Alternately, a user can manually pour water into water heater vessel 205. The water 204 is filled until photo diode 246 senses that the water 204 has reached maximum fill level, at which point solenoid valve 206 is turned off thereby shutting off supply of water. Water 204 is heated by standard heating source 218 until it reaches 212 F degrees at which point a thermo sensor turns off heating element 218 and opens valve 222 letting the heated water 204 into mixing chamber 250. A microprocessor, not shown, coordinates the timing and flow of the automated process being discussed herein. After heated water enters mixing chamber 250, dispenser assembly 230 allows a fixed amount of powdered gel shot material 212 which is stored in cartridge 208 to fall into mixing chamber 250. The dispensing assembly includes a rotary ball 262 which has a cup shape within it. Each time the ball 262 rotates one revolution, it lets a repeatable amount of powder into the mixing chamber 250. For example, each revolution can let in one cubic inch of powder 212, so five revolutions would let in five cubic inches of powder 212. The microprocessor senses number of revolutions and turns off the drive motor 230 when the proper number is reached. Another embodiment of the invention 200 can include more than one gel cartridge 208 containing other flavors, so that the bar tender or waiter can select from one of a variety of flavors.

Dispensing assembly 232 is similar in design to dispenser assembly 230 and lets in a predetermined amount of alcohol 214, for example vodka, into mixing chamber 250. A mixing paddle 226 is rotated by gear motor 220 causing all the ingredients in mixing chamber 250 to be fully mixed. The mixture is then allowed to cool to approximately eighty degrees F. Experiments have shown that the gel mixture remains liquid indefinitely at this temperature. The mixture can be maintained at eighty degrees F. by the use of standard heater wrap 234 which is pre-set to maintain the eighty degree F. temperature. When the user desires fresh gel shots, he or she pushes one of the shot selection buttons 258 on the front of housing 202 as shown in FIG. 5. By pushing the "4" select button, enough gel shot mixture is allowed through shuttle valve 228 to fill four sections of the gel shot matrix 238.

Figure 6:
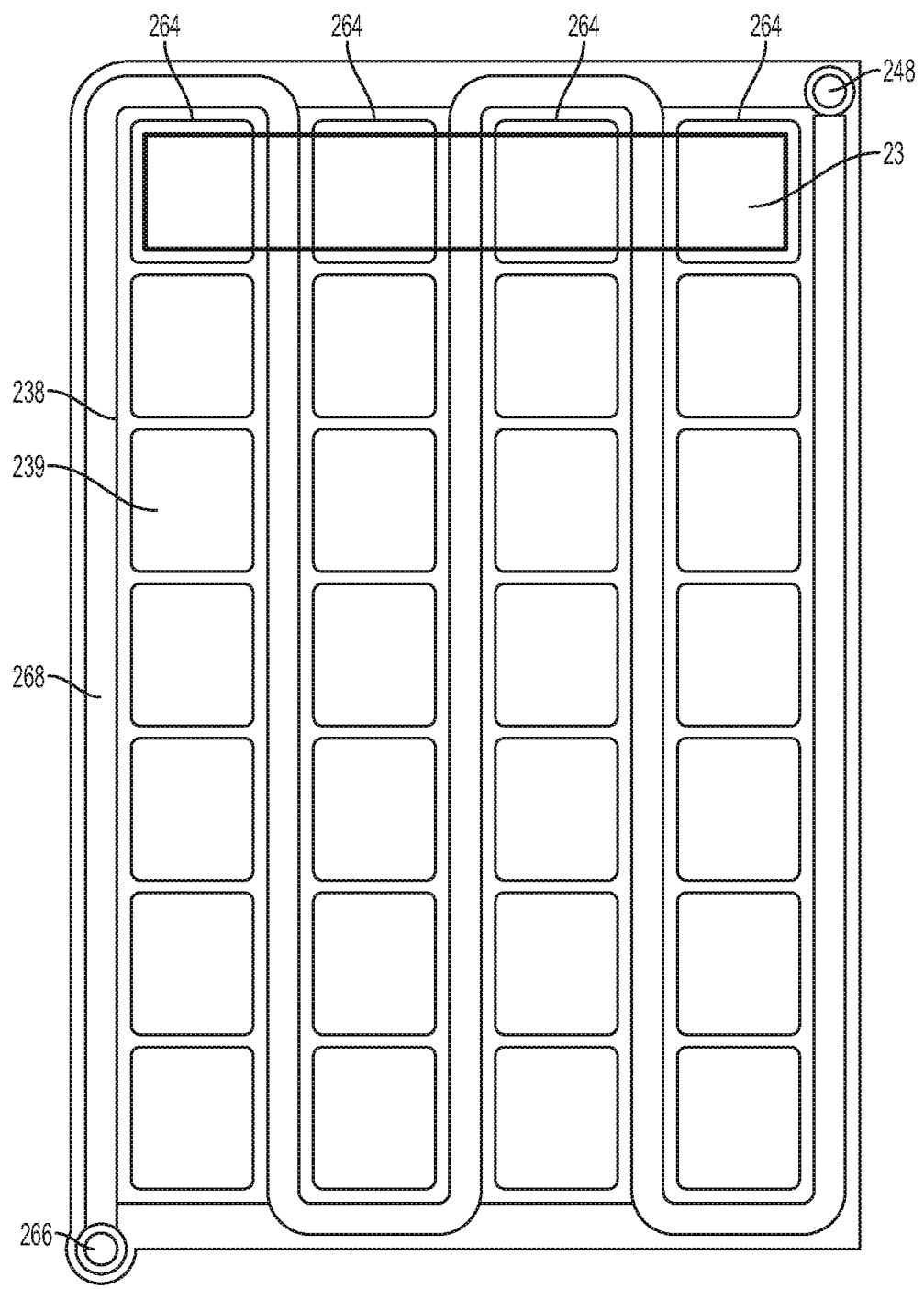
FIG. 6 is a top plan view of the matrix cooling member of the second embodiment of the invention.
Figure 7:
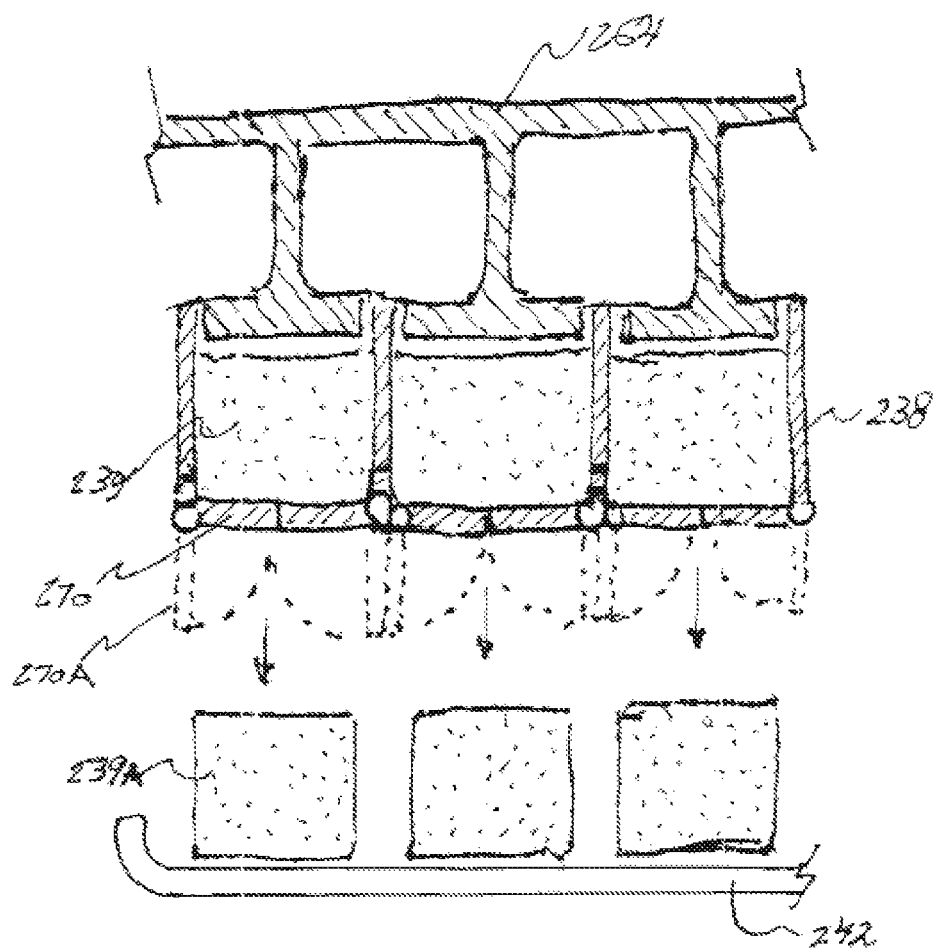
FIG. 7 is a partial side section view of the plunger pushing out gel-shots.

The gel shot matrix 238 can be seen in top view in FIG. 6. An aluminium matrix 238 forms cubical cups 236 for holding gel shots. When the user presses the "4" button on the front of the housing 2, the proper amount of gel shot material is delivered to the matrix 238 to allow the first four cubical cups 264 to be filled. The user can press the "28" button and all the cubical cups 239 will be filled. Obviously, the matrix can be designed to hold more or less cubical cups depending on the volume of gel shots needed. A chilling device 216 such as a Peltier chip array, or a standard compressor chiller produces a super cooled liquid that is pumped through chilling line 248 which then enters serpentine tubular chilling line 268 that is situated between rows of cubical gel shot cups 239. The super cooled liquid, such as ethylene glycol, cools the aluminium matrix 238 which in turn cools the cubical gel shots 239. Experiments show that the gelling effect takes place in approximately five minutes after the gel material is introduced into the matrix 238. This quick gel time is due to the fact that the gel material is entering the matrix 236 at a relatively cool eighty degrees F. rather than the original mixing temperature of 212 F.

When the gel shot material has gelled, a plunger 264, animated by motorized rack and pinion 236, presses down on a row of four cubical gel shots as shown in the top plan view in FIG. 6. The bottom of matrix 238 includes a plurality of spring biased hinged doors 270 that are caused to open 270A as plunger 264 travels downward to allow the gel shot cubes 239, 239A to fall into tray 242. If more cubical gel shots are needed, additional plunger assemblies can push additional cubical gel shots down into tray 242. Tray 242 can slide open from an aperture in the front of the housing 202 as shown in FIG. 5, so that a bar tender or waiter can remove them and serve them to a customer.

As explained above, in a first mode of operation, the heated liquid mixture from the mixing chamber 250 may pass through the chilling device 216. In a second mode of operation, the heated liquid mixture may not pass through the chilling device 216 and instead bypass the entire or a portion (or stage) of the chilling device 216. In this way, the heated liquid mixture may not be chilled by the chilling device, or chilled to a lesser degree than in the first mode, and instead be dispensed at a higher temperature than during the first mode. The tray 242 may then be removed from the device before the gelatin-based product is fully hardened. A user may then insert the tray 242 into an external refrigerator to further refrigerate and solidify the gelatin-based product.

In some embodiments, the device 100 may be sold or leased to a business for a relatively low amount or even given away free of charge. The business may then continually purchase replacement dry ingredients containers 124 as the device 100 is used. This model allows businesses to sell products made by the device 100 without committing large sums of money up-front. Further, it generates a continuous revenue stream for the seller of the dry ingredients containers 124. In some embodiments, businesses that have obtained a device 100 may have accounts with a specific amount of product to be ordered on a monthly basis on an auto-ship platform. This provides the business owner the convenience of not having to remember to place orders.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Likewise, any two components so associated can also be viewed as being "operably connected", or "operably coupled" to each other to achieve the desired functionality.

While particular embodiments of the present invention have been shown and described, it will be obvious to those skilled in the art that, based upon the teachings herein, changes and modifications may be made without departing from this invention and its broader aspects. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.).

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

The invention claimed is:

1. A device for preparing a gelatin-based product, comprising:
   a container receiving portion configured to receive a dry ingredients container comprising gelatin;
   a mixer coupled to the container receiving portion and operative to mix the gelatin with a liquid to form a liquid mixture;
   a heater coupled to the mixer and operative to heat the liquid;
   a plurality of dispensers coupled to the mixer and operative to dispense a predetermined amount of the gelatin-based product into a fluid vessel positioned adjacent to the plurality of dispensers;
   a chilling device positioned adjacent to the mixer and operative to chill the liquid mixture after mixing at the mixer and before dispensing the gelatin-based product via the plurality of dispensers; and
   a housing enclosing each of the mixer, the heater, the chilling device, the plurality of dispensers, and the fluid vessel and wherein the container receiving portion is coupled inside the housing, wherein the heater is adjacent to a first wall of the housing, the mixer is adjacent to a second wall of the housing, and the chilling device is adjacent to a third wall of the housing, wherein the fluid vessel is a tray disposed within the housing and below a dispenser, the tray having a base, and wherein the tray is accessible from an aperture in a front of the housing.

2. The device of claim 1, wherein the plurality of dispensers is operative to dispense single serving amounts of the gelatin-based product into the fluid vessel.

3. The device of claim 1, wherein the container receiving portion is operative to read an indicator on the dry ingredients container when the dry ingredients container is inserted into the container receiving portion to determine whether the dry ingredients container is an authorized container.

4. The device of claim 1, further comprising a plunger mechanism wherein the device is configured to deliver liquid gelatin to a gel tray for hardening the liquid gelatin into cubes, wherein the gel tray is fluidly coupled to the chilling device;
   the hardened gelatin cubes then pushed out by the plunger mechanism.

5. The device of claim 4, further including a warming jacket fastened to an exterior of a mixing chamber that maintains a temperature of the mixing chamber at approximately eighty degrees F. to keep the gelatin within the mixing chamber in a liquid state for as long as needed.

6. The device of claim 1, wherein the front of the housing is a fourth wall of the housing.

7. The device of claim 1, wherein the heater is positioned adjacent to the mixer and above the tray.

8. The device of claim 1, wherein the plurality of dispensers is positioned adjacent to the tray within the housing.

9. The device of claim 1, further comprising one or more inputs positioned on an exterior of the front of the housing, wherein the one or more inputs are operable by a user.

10. The device of claim 1, wherein the container receiving portion is positioned above the plurality of dispensers in the housing and wherein the device is a counter top device sized to fit on a counter.

11. The device of claim 1, further comprising a water tube coupled to the housing and the heater, wherein the water tube is adapted to introduce water from a water source outside the housing to the heater.

12. The device of claim 1, wherein the heater is arranged adjacent to the mixer and further comprising a valve disposed between the heater and the mixer.

13. The device of claim 1, further comprising a bypass line to bypass the chilling device in a selective mode of operation.

14. A device for preparing a gelatin-based product, comprising:
   a container receiving portion configured to receive a dry ingredients container and to extract dry ingredients stored within the dry ingredients container, wherein the dry ingredients comprise gelatin;
   a mixer coupled to the container receiving portion and operative to mix the gelatin with a liquid to form a liquid mixture;
   a heater coupled to the mixer and operative to heat the liquid;
   a dispenser coupled to the mixer;
   a chilling device positioned adjacent to the mixer and operative to chill the liquid mixture after mixing at the mixer and before dispensing the gelatin-based product via the dispenser;

a tray positioned below the dispenser, wherein the dispenser is operative to dispense the gelatin-based product into the tray; and a housing enclosing each of the mixer, the heater, the chilling device, the dispenser, and the tray, wherein the housing includes an aperture in a first wall of the housing, wherein the tray is accessible from the aperture, and wherein the heater, the mixer, and the chilling device are positioned inside walls of the housing.

15. The device of claim 14, wherein the first wall of the housing is a front wall of the housing and wherein the device is a counter top device sized to fit on a counter.

16. The device of claim 15, further comprising one or more inputs positioned on the front wall of the housing, wherein the one or more inputs are operable by a user.

17. The device of claim 14, wherein the tray is adjacent to the chilling device within the housing.

18. The device of claim 14, wherein the dispenser includes a plurality of dispensers.

19. The device of claim 14, wherein the container receiving portion is coupled inside the housing.

20. The device of claim 14, further comprising a bypass line to bypass the chilling device in a selective mode of operation.

* * * * *